United States Patent [19]
Black et al.

[11] Patent Number: 5,787,332
[45] Date of Patent: Jul. 28, 1998

[54] PROCESS FOR RECOVERING TANTALUM AND/OR NIOBIUM COMPOUNDS FROM COMPOSITES CONTAINING A VARIETY OF METAL COMPOUNDS

[75] Inventors: William D. Black; David R. Tierney, both of Johnson City, Tenn.; Henrietta Notzl-Loiselle, Saskatoon, Canada

[73] Assignee: Fansteel Inc., North Chicago, Ill.

[21] Appl. No.: 721,104

[22] Filed: Sep. 26, 1996

[51] Int. Cl.$^6$ .............. C01F 17/00; C01G 33/00; C01G 35/00; C01G 43/025
[52] U.S. Cl. .............. 423/9; 423/16; 423/21.1; 423/21.5; 423/68; 423/70
[58] Field of Search .............. 423/9, 16, 21.1, 423/21.5, 68, 70

[56] References Cited

U.S. PATENT DOCUMENTS

| | | | |
|---|---|---|---|
| 3,107,976 | 10/1963 | Koerner et al. | 423/68 |
| 4,446,116 | 5/1984 | Krismer et al. | |
| 4,451,438 | 5/1984 | Floeter et al. | 423/68 |
| 4,495,158 | 1/1985 | Ritsko et al. | 423/68 |
| 4,718,995 | 1/1988 | Vanderpool et al. | |
| 5,023,059 | 6/1991 | Bielecki et al. | |
| 5,084,253 | 1/1992 | Pollock et al. | |
| 5,273,725 | 12/1993 | Carlson. | |
| 5,384,105 | 1/1995 | Carlson. | |
| 5,385,723 | 1/1995 | Carlson. | |
| 5,437,848 | 8/1995 | Hard | 423/68 |
| 5,531,970 | 7/1996 | Carlson. | |

FOREIGN PATENT DOCUMENTS

| | | | |
|---|---|---|---|
| 271340 | 8/1989 | Germany | 423/68 |

OTHER PUBLICATIONS

N.S. Mahapatra, U. Purkayastha, and S. Sarkar, "The Development of a Simple Method for the Preparation of Reactor–Grade Zirconium", Separation Science, 10(6), 755–766, 1975, (no month available).

M. Benedict, T.H. Pigford, and H.W. Levi, "Nuclear Chemical Engineering", Mc–Graw–Hill, Inc., New York, NY, 293–305, 1981 (no month available).

G. Gongyi C. Yuli, and L. Yu, "Solvent Extraction of Scandium from Wolframite Residue", Journal of Metals, 28–31, Jul. 1988.

L.D. Lash, J.R. Ross, "Scandium Recovery from Vitro Uranium Solutions", Preprint No. 61B51, Society of Mining Engineers of AIME, New York, NY, (Mar. 1961).

I.V. Vinarov, "Mondern Methods of Separating Zirconium and Hafnium", Russian Chemical Reviews, vol. 36, No. 7, 522–536, Jul. 1967.

S.V. Elinson and K.I. Petrov, "Analytical Chemistry of Zirconium and Hafnium", Ann Arbor–Humphrey Science Publishers, New York, New York, 38–39, 1969, (no month available).

(List continued on next page.)

*Primary Examiner*—Wayne Langel
*Attorney, Agent, or Firm*—Barnes, Kisselle, Raisch, Choate, Whittemore & Hulbert, P.C.

[57] ABSTRACT

A process for treating composite materials comprising metals and having significant radioactivity for separation into concentrated individual products is provided. The process of the invention recovers valuable metals and semi-metal elements including rare earth, transition metal, radioactive elements, and compounds and composites thereof as commercially viable products while isolating the radioactive components. They key components in the composite material which are desired to be recovered are tantalum, niobium, and scandium due to their high commercial values and significant quantities. The process further includes the capability to recover uranium, thorium, rare earth, and zirconium products. Generally, the process consists of an initial sulfate roast followed by a series of hydrometallurgical unit operations designed to separate and purify the desired components into commercially usable products, such as tantalum and/or niobium in the form of metal oxides, $M_2O_5$; uranium in the form of yellowcake; thorium oxalate; zirconium oxide; and rare earth sulfates.

22 Claims, 11 Drawing Sheets

OTHER PUBLICATIONS

R.C. Merritt, "The Extractive Metallurgy of Uranium", U.S. Atomic Energy Commission, 247–249, 1971, (no month available).

R.C. Vickery, "The Chemistry of Yttrium and Scandium", Chapter 6, Pergamon Press, New York, New York, 70–79, 1960, (no month available).

J.R. Ross and C.H. Schack, "Recovery of Scandium from Uranium Plant Iron Sludge and from wolframite Concentrates", Report of Investigations 6580, U.S. Department of the Interior, Bureau of Mines, 1–22, 1965, (no month available).

R.J. Callow, "The Industrial Chemistry of the Lanthanons, Yttrium, Thorium and Uranium", Pergamon Press, New York, New York, 78–79, 1967, (no month available).

T.Y. Yan, "Uranium Precipitation from Eluate Using Hydrogen Peroxide", Minerals & Metallurgical Processing, 222–224, Nov. 1990.

D.D. Harbuck and G.R. Palmer, "Scandium Recovery from a Tantalum Waste Residue: A Status Report", U.S. Bureau of Mines, Salt Lake City Research Center, Nov. 1991.

I. Gaballah, E. Allain, M.-CH. Meyer–Joly, and K. Malau, "A Possible Method for the Characterization of Amorphous Slags: Recovery of Refractory Metal Oxides from Tin Slags", Metallurgical Transactions B, vol. 23B, 249–259, Jun. 1992.

W.R. Schoeller and A.R. Powell, "The Analysis of Minerals and Ores of the Rarer Elements", Charles Griffin & Co., Ltd., London, (no date available).

Main Process Flow Chart - Chart 1

1. Wet mill composite material comprising $Ta_2O_5$, $Nb_2O_5$, and metal fluorides ($MF_y$) to achieve average particle size of less than 150 um.

2. Form slurry of composite material at a 30% solids concentration.

Metal residues from Chart 9, #2 →

3. Remove free water from composite material, preferably with a spray dryer.

4. Mix $H_2SO_4$ with composite material.

5. Roast acid mixture at 500°C for at least 30 minutes, preferably in a rotary calciner.
   $$MF_x + {}^x/_2H_2SO_4 \rightarrow M(SO_4)_{x/2} + XHF\uparrow$$

→ Acid gas to Chart 2, #1

6. Leach calcined composite material to dissolve $M(SO_4)_{x/2}$ to leachate.

Return HCl from Chart 4, #8 →     → Leachate to Chart 3, #1

7. Add acid (HCl or $HNO_3$) to composite materials to dissolve $CaSO_4$.

Ta/Nb cmpds. from Chart 6, #4 →     → Acid soln. to Chart 4, #1

8. Add caustic (NaOH) to composite material to react any double sulfate compounds and form hydroxide compounds.
   $$M_x(SO_4)_y \cdot Na_2SO_4 \cdot 2H_2O(s) + (2Y)NaOH \rightarrow XM(OH)_{2Y} + (Y+1)Na_2SO_4$$

Return HCl from Chart 4, #8 →     → Caustic soln. to Chart 9, #1
                                         and Chart 4, #4

9. Add acid (HCl or $HNO_3$) to the composite material containing metal hydroxide to form metal chloride or metal nitrate compounds.
   $$XM(OH)_{2Y} + 2YHCl \rightarrow MCl_{2Y} + 2YH_2O$$

→ Acid soln. to Chart 4, #1

10. Wash the composite material to remove the metal chloride or metal nitrate compounds.

11. Remove residue composite materials with concentrated $Ta_2O_5$ and $Nb_2O_5$.

Figure 1

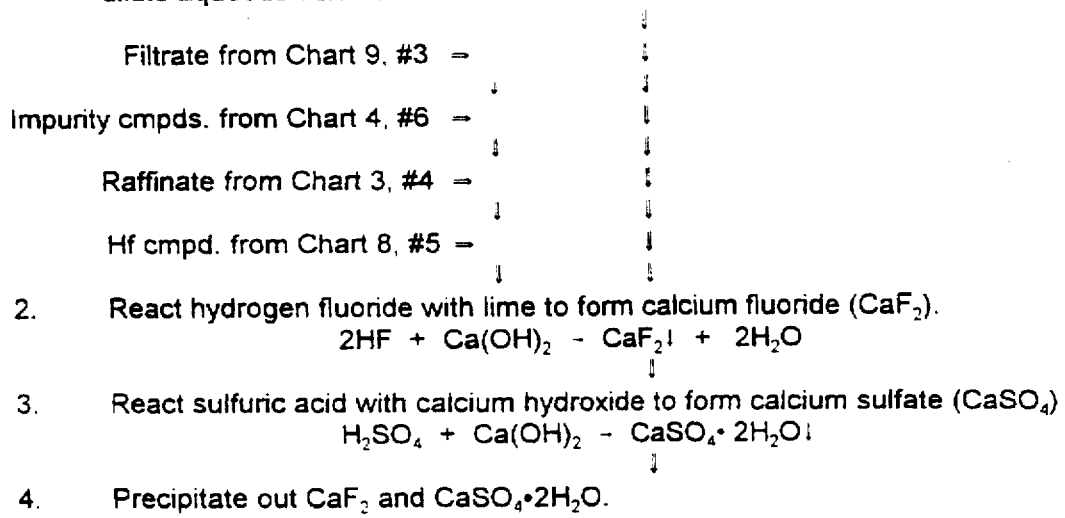

Acid Gas Treatment Flow Chart - Chart 2

1. Absorb acid gases (HF and $H_2SO_4$) from Chart 1, #5 with water in a scrubber to form dilute aqueous acid streams.

Filtrate from Chart 9, #3 →

Impurity cmpds. from Chart 4, #6 →

Raffinate from Chart 3, #4 →

Hf cmpd. from Chart 8, #5 →

2. React hydrogen fluoride with lime to form calcium fluoride ($CaF_2$).
   $$2HF + Ca(OH)_2 \rightarrow CaF_2\downarrow + 2H_2O$$

3. React sulfuric acid with calcium hydroxide to form calcium sulfate ($CaSO_4$)
   $$H_2SO_4 + Ca(OH)_2 \rightarrow CaSO_4 \cdot 2H_2O\downarrow$$

4. Precipitate out $CaF_2$ and $CaSO_4 \cdot 2H_2O$.

Figure 2

Leachate Treatment Flow Chart - Chart 3

1. Add phosphoric acid ($H_3PO_4$) to leachate from Chart 1, #6 to precipitate out Ta/Nb, zirconium, thorium and scandium phosphate compounds.

$Zr(SO_4)_2 + 2H_3PO_4 + H_2O \rightarrow Zr(HPO_4)_2 \cdot H_2O\downarrow + 2H_2SO_4$ → Phosphate cmpds. to Chart 6, #1

2. Contact uranium sulfate compounds of leachate with primary amine extraction solvent.

$[UO_2(SO_4)_2]^{2-} + 2(C_{20}H_{41}NH)(Cl) \rightarrow (C_{20}H_{41}NH)_2[UO_2(SO_4)_2] + 2Cl^-$ 3. Add hydrochloric acid to extraction solution to strip uranium sulfate compounds.

$(C_{20}H_{41}NH)_2[UO_2(SO_4)_2] + 2HCl \rightarrow [UO_2(SO_4)_2]^{2-} + 2(C_{20}H_{41}NH)(Cl) + 2H^+$ → HCl strip soln. to Chart 5, #1

4. Add sodium sulfate ($Na_2SO_4$) to rare earth sulfates ($RE_2(SO_4)_3$ in aqueous raffinate solution to precipitate rare earth double sulfates.

$2RE_2(SO_4)_3 + 3Na_2SO_4 \rightarrow RE_2(SO_4)_3 \cdot 3Na_2SO_4 \cdot 2H_2O\downarrow$ → Raffinate soln. to Chart 2, #2

5. Recover rare earth double sulfates.

Figure 3

Acid Solution Flow Chart - Chart 4

1. Add $H_3PO_4$ to acid solutions from Chart 1, #7 and #9 to precipitate out zirconium, thorium and scandium phosphate compounds.

HCl strip soln. from Chart 5, #4 → → Phosphate cmpds. to Chart 6, #1

2. Contact acid solution containing uranium, thorium, zirconium and scandium chloride residuals with ion-exchange resin containing sulfonic and gem-diphosphonic acid groups.

3. Contact ion-exchange resin with ammonia carbonate $((NH_4)_2CO_3)$ solution to strip metal chloride residuals.

Caustic soln. from Chart 1, #8 →

Evap. bottoms acid from #7 below →

4. Add acid to decompose $(NH_4)_2CO_3$ solution and caustic to precipitate metal residuals for removal by filtration and recycle via Chart 9, #1 to slurry dryer.

→ $NH_4$ filtrate discharge to POTW

5. Add barium chloride $(BaCl_2)$ to acid solution to co-precipitate radium compounds.

→ Radium cmpds. to Chart 5, #4

6. Add soda ash $(Na_2CO_3)$ to acid solution to precipitate calcium and other impurity compounds.

Raffinate from Chart 7, #3 → → Impurity cmpds. to Chart 2, #2

7. Feed acid solution to an evaporator/condenser to separate hydrochloric acid as overheads for reuse in the main process.

→ Evap. bottoms to Chart 9, #1 and #4, above

8. Return HCl to Chart 1, #7 and #9.

Figure 4

Uranium Flow Chart - Chart 5

1. Add sodium phosphate ($Na_3PO_4 \cdot 12H_2O$) to HCl strip solution from Chart 3, #3 to precipitate out residual zirconium, thorium and scandium phosphate compounds.

→ Phosphate cmpds. to Chart 6, #1

2. Add NaOH to HCl strip solution raising pH to the range 2.5 - 3.5.

3. Add water to HCl strip solution to reduce chloride concentration below 50 g/L.

Radium cmpds. from Chart 4, #5 →

4. Add hydrogen peroxide ($H_2O_2$) to HCl strip solution to precipitate out uranium peroxide compound.

$$UO_2^{+2} + H_2O_2 + XH_2O \leftrightarrow UO_4 \cdot XH_2O \downarrow + 2H^+$$

→ HCl strip soln. to Chart 4, #2

5. Recover uranium peroxide compound.

Figure 5

Phosphate Compounds Flow Chart - Chart 6

1. Add 30 - 40% sulfuric acid to phosphate compounds from Chart 3, #1; Chart 4, #1 and Chart 5, #1 to selectively dissolve scandium and thorium leaving Ta/Nb and zirconium(hafnium) (Zr/Hf) in the residue.

→ $H_2SO_4$ soln. to Chart 7, #1

2. Add 3% hydrofluoric acid (HF) solution to dissolve Zr/Hf in the residue and filter off any insoluble material preferably residual scandium and thorium fluorides → Insolubles to Chart 9, #1

3. Add sodium fluoride (NaF) to acid solution to precipitate sodium fluozirconate(hafniate) ($Na_3Zr_2(OH)F_{10}$) compounds and recover by filtration.

→ $Na_3Zr_2(OH)F_{10}$ cmpds to Chart 8, #1

4. Add NaOH to precipitate Ta/Nb compounds and recover by filtration.

→ Ta/Nb cmpds. to Chart 1, #8.

5. Filtrate solution to wastewater treatment in Chart 9, #1

Figure 6

Scandium Flow Chart - Chart 7

1. Contact scandium and thorium compounds in the sulfuric acid solution from Chart 6, #1 with extraction solvent made up with 5-10% trialkylphosphine oxides and 5-10% 2-ethylhexyl 2-ethylhexylphosphonic acid.

2. Add 1.0 N hydrofluoric acid solution to strip scandium fluoride compounds from solvent.

3. Add oxalic acid to thorium compound in aqueous raffinate solution to precipitate thorium oxalate.

$$Th(SO_4)_2 + 2C_2O_4H_2 + XH_2O \rightarrow Th(C_2O_4)_2 \cdot XH_2O + 2H_2SO_4$$

→ Raffinate to Chart 4, #7

4. Recover thorium oxalate compound.

5. Add NaOH and heat to HF strip solution to precipitate and filter scandium hydroxide compounds.

→ Filtrate soln. to Chart 9, #1

6. Add HCl to digest scandium hydroxide compounds and adjust solution pH to 4.0 with caustic. Heat to 100°C to separate zirconium, titanium and iron compounds from the solution by precipitation and filtration.

→ Zr/Ti/Fe cmpds. to Chart 9, #1

7. Add oxalic acid ($C_2O_4H_2$) to filtrate to precipitate scandium oxalate compounds.

$$2ScCl_3 + 3C_2O_4H_2 + XH_2O \rightarrow Sc_2(C_2O_4)_3 \cdot XH_2O) + 6HCl$$

→ Filtrate soln. to Chart 9, #1

8. Calcine scandium oxalate compound at 750°C, preferably in a tray dryer, converting to scandium oxide compound.

9. Recover scandium oxide compound.

Figure 7

Zirconium Flow Chart - Chart 8

1. Add NaOH to $Na_3Zr_2(OH)F_{10}$ cmpds. from Chart 6, #3 to form Zr/Hf hydroxide compounds.
   → Caustic soln. to Chart 9, #1

2. Add nitric acid ($HNO_3$) to the Zr/Hf hydroxide compounds to form Zr/Hf nitrate compounds in a solution with a free nitric acid concentration of 6 N and filter off insoluble material.
   → Insolubles to Chart 9, #1

3. Contact Zr/Hf nitrate compounds with extraction solvent made up of 50% tributylphosphate (TBP) in odorless kerosine.

4. Add water to strip zirconium nitrate from solvent.

5. Add sodium phosphate ($Na_3PO_4 \cdot 12H_2O$) to aqueous raffinate to precipitate and filter off hafnium phosphate compounds.
   → Hf cmpd. to Chart 2, #2

6. Return filtered raffinate to Step #2 to reuse as nitric acid in dissolving Zr/Hf hydroxide compounds.

7. Add ammonia to precipitate zirconium hydroxide compound from the water strip solution.
   → Strip soln. discharge to POTW 8. Filter and dry the resulting Zr hydroxide cake at 400°C.

9. Convert the $Zr(OH)_4$ to zirconia ($ZrO_2$) in a retort at 700°C.

Figure 8

Wastewater Treatment Flow Chart - Chart 9

1. Mix caustic solution from Chart 1, #8; evaporator bottoms from Chart 4, #7, filtrate solution from Chart 7, #5, Zr/Ti/Fe compounds from Chart 7, #6, filtrate solution from Chart 7, #7, caustic solution from Chart 8, #1, insolubles from Chart 6, #2, filtrate solution from Chart 6, #5, metal residuals from Chart 4, #4, and insolubles from Chart 8, #2.

2. Add NaOH to mixture raising pH to 8.0 thereby separating metal residues from the solution by precipitation and filtration.

→ Metal residues to Chart 1, #3

3. Filtered solution is returned to Chart 2, #2 to recover fluoride content as $CaF_2$.

Figure 9

Scandium Yield and Losses for WIP Process

Ta/Nb Yield and Losses for Wip Process

PROCESS FOR RECOVERING TANTALUM AND/OR NIOBIUM COMPOUNDS FROM COMPOSITES CONTAINING A VARIETY OF METAL COMPOUNDS

FIELD OF THE INVENTION

This invention generally relates to processes for recovering metal from composite materials.

BACKGROUND OF THE INVENTION

In the processing of tantalum ore to obtain tantalum concentrates a variety of residual compounds are generated. This residue contains tantalum, niobium (Nb, previously referred to as columbium), and scandium, as well as other metals such as uranium, thorium, zirconium, and hafnium. In the processing of tantalum ore to produce tantalum products certain metal ores are included which have substantial radioactivity, for example, tantalum and niobium bearing ores may contain on the order of 1 percent by weight uranium and thorium. Ore processing residues or tailings contain quantities of uranium, thorium, tantalum, niobium, and scandium. It is presently typically not feasible to recover concentrated quantities of these materials and the radioactive component presents a disposal problem. Present methods for treating residues leave substantial uranium and/or other radioactive elements unrecovered. In addition, commercially valuable components are not sufficiently concentrated and rendered to an acceptable form for sale and commercial use.

Based on the shortcomings of the art and in view of the fact that methods for adequately treating residue rendering the components to commercially viable products has not been obtained, there remains a need for such a process.

SUMMARY OF THE INVENTION

A process for treating composite materials comprising metals and having significant radioactivity for separation into concentrated individual products is provided. The process generally involves an initial sulfate roast followed by a series of hydrometallurgical unit operations designed to separate and purify valuable metals and semi-metal elements including rare earth, transition metal, radioactive elements, and compounds and composites thereof into commercially viable products while isolating the radioactive components. Generally, the hydrometallurgical unit operations involve a series of acid digestions and caustic reactions designed to dissolve and/or precipitate and recover the desired compounds at different stages of the process. The key components in the composite material which are desired to be recovered are tantalum, niobium, and scandium due to their high commercial values and significant quantities. The process further includes the capability to recover uranium, thorium, rare earth, and zirconium products.

Objects, features, and advantages of the invention include a significantly simplified process for the recovery of substantial amounts of concentrated, commercially usable forms of tantalum, niobium, scandium, uranium, and thorium from ore residues; such process which is energy efficient, provides highly concentrated products, recyclability for internal re-use of waste streams, and which readily provides purified chemical products from industrial tailings or wastes.

These and other objects, features, and advantages will become apparent from the following description of the preferred embodiments, claims, and accompanying drawings.

BRIEF DESCRIPTION OF THE DRAWINGS

FIG. 1 is a schematic diagram showing a process for recovering tantalum and niobium (Nb, previously referred to as columbium) compounds from a composite material according to the invention.

FIG. 2 is a schematic diagram showing a process for treating a stream comprising acidic gases generated by the process of FIG. 1.

FIG. 3 is a schematic diagram showing a process for treating a leachate stream generated during the process of FIG. 1.

FIG. 4 is a schematic diagram showing a process for treating an acid solution stream generated by the process of FIG. 1.

FIG. 5 is a schematic diagram showing a process for recovering a uranium compound from a liquid stream generated by the process according to FIG. 3.

FIG. 6 is a schematic diagram showing a process for treating phosphate compounds generated primarily as a result of the process shown in FIG. 3, where FIG. 6 further includes treatment of process streams as shown in FIGS. 1 and 5.

FIG. 7 is a schematic diagram showing a process for recovering scandium compounds as well as any thorium compounds based on processing of the stream as shown in FIG. 6.

FIG. 8 is schematic diagram showing a process for recovering zirconium compounds based on processing of the stream as shown in FIG. 6.

FIG. 9 is a schematic diagram showing a process for treating liquid waste streams generated during the processes as described in FIGS. 1 through 8, and primarily generated by the processes shown in FIGS. 1, 4, 6, 7, and 8.

DETAILED DESCRIPTION OF THE PREFERRED EMBODIMENTS

Figure 10:
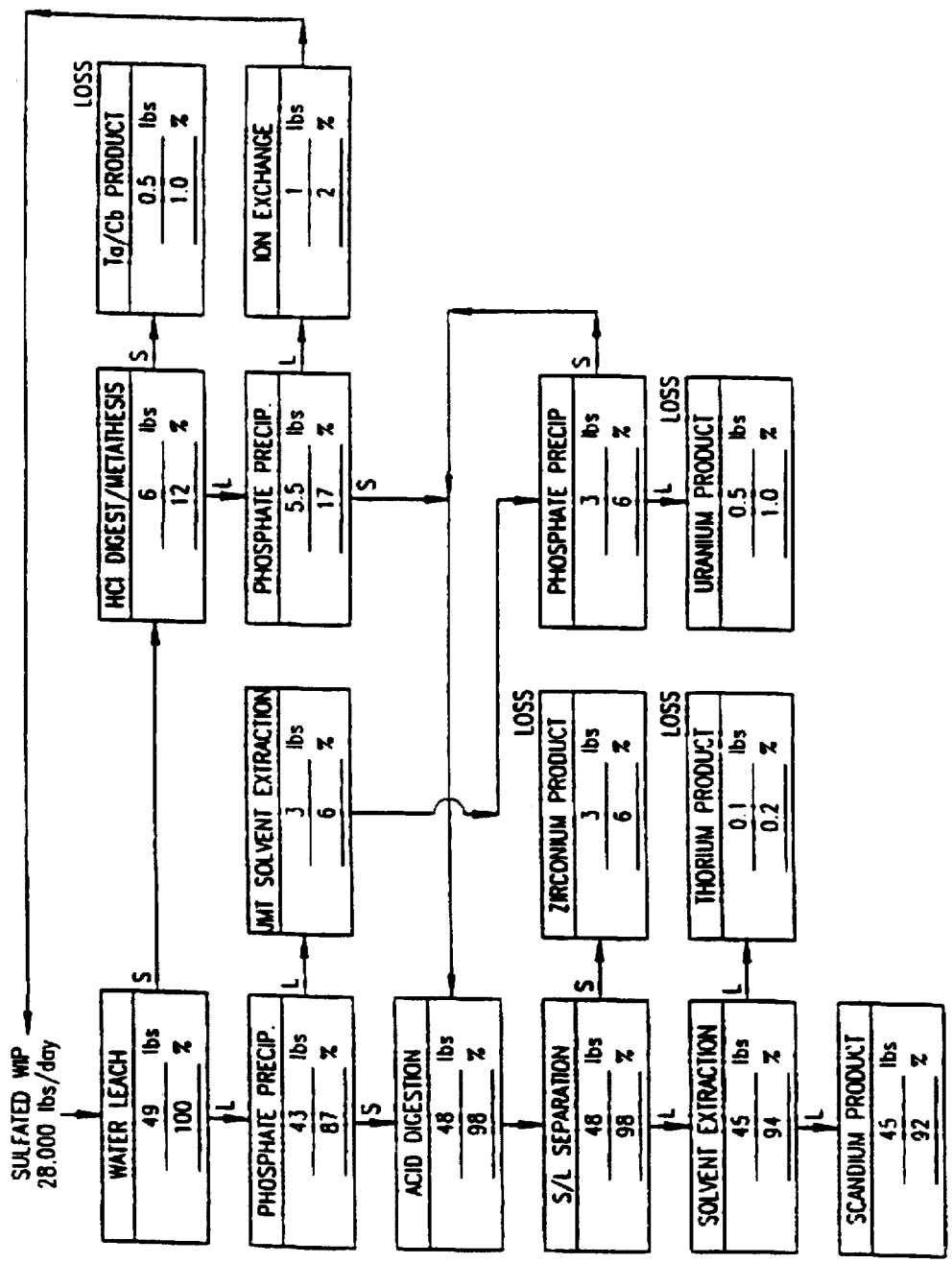
FIG. 10 is a block diagram showing scandium yield and losses derived during an actual test of the process.

The present invention provides a process for treating composite materials comprising metals and having significant radioactivity for separation into concentrated individual products. The process of the invention recovers valuable metals as commercially viable products while isolating radioactive components. The process treats a composition having an average solid content of 40 percent. The major components are metal and semi-metal elements including rare earth, transition metal, radioactive elements, and compounds and composites thereof. The major components in the composite residue are as listed in Table 1. The key components in the composite material which are desired to be recovered are tantalum, columbium (Cb, now referred to as niobium, Nb), and scandium, due to their high commercial values and significant quantities. Tantalum, niobium, and scandium inputs to the process as depicted in the schematic diagrams (FIGS. 1 through 9) are based on the processing of 10 tons per day of composite material, containing average concentrations of 1 percent, 1 percent, and 0.16 percent for tantalum, niobium (columbium), and scandium, respectively. Assuming 100 percent recovery, from the estimated 10 tons per day of composite material, about 0.87 tons (1,733 pounds) per day of tantalum concentrate will be recovered having an $M_2O_5$ content of 30 percent and a Ta:Cb (Ta:Nb) ration of 1:1. Again, assuming 100 percent yield, 0.0245 tons (49 pounds) per day of scandium oxide ($Sc_2O_3$) will also be recovered from the 10 tons per day of composite material. The actual amounts of tantalum concentrate and $Sc_2O_3$ recovered will vary slightly according to the processes discussed below.

Due to the uranium and thorium content, the composite material is considered a radioactive source material. The key components recovered by the method are tantalum, niobium (columbium) and scandium due to their high commercial value. The process further includes the capability to recover uranium, thorium, rare earth, and zirconium products. The products of the invention include tantalum and/or columbium in the form of metal oxides $M_2O_5$; uranium in the form of yellowcake; thorium oxalate; zirconium oxide; and rare earth sulfates. Such components are commercially useful in various nuclear fuel and catalytic applications.

An understanding of the overall process is achieved by reference generally to FIGS. 1 through 9 which contain main process flow chart 1 (FIG. 1), acid gas treatment flow chart 2 (FIG. 2), leachate treatment flow chart 3 (FIG. 3), acid solution flow chart 4 (FIG. 4), uranium flow chart 5 (FIG. 5), phosphate compounds flow chart (FIG. 6), scandium flow chart 7 (FIG. 7), zirconium flow chart 8 (FIG. 8), and finally wastewater treatment flow chart 9 (FIG. 9).

As can be seen by reference to the Figures, the process consists of an initial sulfate roast followed by a series of hydrometallurgical unit operations designed to separate and purify tantalum, niobium, scandium, uranium, and thorium. Zirconium and rare earth compounds are also extracted and converted to products acceptable for commercial use.

Part I—Feed Preparation

Referring to FIG. 1, composite material (residue) is removed from holding ponds and prepared as feed to the recovery process by conventional mining and milling techniques. The terms "composite material" and "residue" are used interchangeably. Oversized solids are first separated from the finer material by screening and then size reduced with a hammer mill. The rough milled material is then recombined with the finer material and run through a ball mill to reduce all solids to less than a 150 mesh size. This reduction in material size ensures that a consistent operation in the next step of the recovery process, spray drying, can be maintained. To minimize energy consumption, dilute residue slurry is thickened by settling in feed storage tanks to maintain a slurry feed to the spray dryer with about a 30 weight percent solids content.

The residue solids in the thickened slurry are dried prior to mixing with sulfuric acid to minimize the potential for scaling and corrosion in the downstream rotary calciner and off-gas ducting. Since drying tests indicated that the residue solids adhere to heat transfer surfaces, a spray dryer was initially specified for the operation. However, the method is not limited to spray drying. Though no chemical reactions occur in the dryer, it is preferred to treat the off-gas, essentially water vapor, in an air pollution control system as per FIG. 2.

Part II—Fluoride Removal

The general approach chosen for composite material (residue) processing was based on stripping away components other than tantalum (Ta) and columbium (Cb, now referred to as niobium, Nb). This results in a tantalum concentrate which is amenable to conventional processing by tantalum refiners. Table I shows that the composition of the composite material (residue) is predominated by its fluoride content. If the composite material was contacted directly with acid, the resulting fluoride in solution in combination with the alkali elements sodium and potassium would cause unwanted precipitation reactions involving zirconium while interfering with the subsequent recovery of scandium and the isolation of thorium, since the fluoride salts of each have minimal solubility. Fluoride removal was thus considered an important first step in the development of the process.

Fluoride removal is based on conventional sulfuric acid roasting operations such as hydrofluoric acid production from fluorspar or the opening of bastnasite ore for the production of rare earths. The sulfation technique was refined to minimize potential losses of tantalum and niobium in downstream operations. In the current process, dried composite material (residue) is mixed with concentrated sulfuric acid and then calcined at 500° C. for at least 1 hour to drive off fluoride as HF gas. The conversion of fluoride compounds to sulfate is shown by the following chemical equation, for metals in general and for calcium. Calcium is the predominant fluoride salt in the composite material (residue).

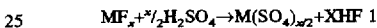

$$MF_x + x/2 H_2SO_4 \rightarrow M(SO_4)_{x/2} + xHF \quad 1$$

For M=calcium:

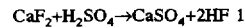

$$CaF_2 + H_2SO_4 \rightarrow CaSO_4 + 2HF \quad 1$$

The sulfated residue is more amenable to leaching, since the reaction converts much of the insoluble residue metals to more soluble sulfate compounds. With a 99.5 percent conversion efficiency, the reaction virtually eliminates the presence of fluoride in downstream operations. Desirably, leach liquor fluoride concentrations will not exceed 50 PPM. The sulfated residue solids increase in mass by approximately 40 percent as a result of conversion from fluoride to sulfate compounds. The sulfated solids are transferred to the leaching operations where Ta/Cb (Ta/Nb) are separated from the bulk of the other residue components.

Part III—Water Leach

Referring to FIGS. 1 and 3, the sulfated solids discharged from the calciner are transported to the water leach operation where water-soluble sulfates are dissolved. The leaching is desirably carried out in a continuous stirred tank reactor (CSTR) with operating conditions of 15 weight percent solids content, 90° C. temperature, and a one hour residence time. The bulk of the scandium, zirconium, and uranium contained in the residue move to the aqueous phase. Significant portions of the thorium and titanium also move to the aqueous phase. Approximately 30 percent to 40 percent of the incoming residue solids are dissolved in the water leach and thus removed form the tantalum product. Ta/Cb (Ta/Nb) losses average about 30 percent. Because a large portion of the original residue is calcium, the content of the water-leached solids is predominately insoluble calcium sulfate. Preferably, a continuous pressure filter is used to separate these solids from the liquor. A typical composition of metal sulfates reporting to the water leach liquor is shown in Table II.

Part IV (A)—Scandium Recovery

The bulk of the scandium is separated from the residue solids by the water leach step per FIGS. 1 and 3. Along with the scandium, much of the thorium, zirconium, and uranium report to the water leach liquor. Techniques of precipitation, acid digestion, and solvent extraction were developed in a specific combination to extract and separate scandium from the metals as per FIGS. 3 through 7. About 10 percent to 15 percent of the scandium remains in the leached solids, but most of this portion is recovered in the first HCl digestion step. For scandium, an oxide powder ($Sc_2O_3$) having a purity of at least 95 percent is produced at the rate of about 45 LB/day. For thorium, an oxalate filtercake ($Th(C_2O_4)_2 \cdot H_2O$) is generated at the rate of 250 LB/day which is a suitable feedstock for catalyst manufacture. For uranium, a yellowcake product is produced at the rate of 120 LB/day.

Part IV (B)—Phosphate Precipitation

The primary method for the recovery of scandium, thorium, and zirconium from the residue process liquors involves phosphoric acid addition to precipitate the insoluble phosphates (FIGS. 3 through 5). Soluble tantalum and columbium (Nb) in the water leach liquor also precipitates allowing its recovery by a later separation from zirconium as discussed in Part VIII. Phosphate precipitation is effective for the commercial separation of zirconium from uranium. Scandium phosphate precipitation is also an effective separation technique. The following reactions illustrate phosphate precipitation in the water leach liquor as per FIG. 3. Similar reactions occur in the acid chloride liquors.

For zirconium:

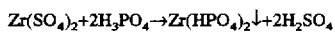

For thorium:

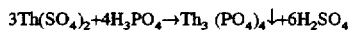

Concentrated phosphoric acid (75 percent) is added at the rate of 0.08 ton per ton WIP to a CSTR with a residence time of one hour. The precipitated solids are separated from the liquor by filtration. The phosphate solids from the water leach liquor (FIG. 3) are combined with the smaller portions precipitated from the chloride liquors generated by the subsequent HCl digestion of residue solids and by uranium solvent extraction. (Refer to FIG. 1, 3, 4, and 5.)

Part IV (C)—Recovery of Phosphate Compounds

The precipitated phosphates of tantalum, niobium, scandium, thorium, and zirconium are initially contacted with 30 percent to 40 percent sulfuric acid to selectively dissolve scandium and thorium leaving Ta/Nb and zirconium (hafnium) (Zr/Hf) as a solid residue (FIG. 6). The sulfuric acid solution is separated from the residue by filtration and directed to the scandium recovery section (FIG. 7). The Zr/Hf and Ta/Nb residue is contacted with a 3 percent hydrogen fluoride (HF) solution and any residual scandium or thorium is precipitated. Sodium fluoride (NaF) is added to the HF solution to precipitate out sodium fluozirconate (hafniate) ($Na_3Zr_2(OH)F_{10}$). The fluozirconate solids are separated from the liquor by filtration and sent to the zirconium recovery section (FIG. 8) while the resulting filtrate is neutralized with NaOH to precipitate out Ta/Nb which is filtered out and fed to the sulfate metathesis whence it subsequently combines with the composite material of the main process section (FIG. 1).

Part IV (D)—Solvent Extraction Purification

Referring to FIG. 7, the scandium and thorium compounds in sulfuric acid are fed to a solvent extraction system with mixer/settler equipment similar to that used for uranium recovery, but smaller in size. Though solvent extraction is used for the purification of scandium, the particular blend of impurities in the residue dictated that the standard solvent mixtures needed improvement. The organic solvent developed for this application comprises by volume, 5 percent trialkylphosphine oxides, e.g., CYANEX® 923 manufactured by Cyanamid, and 5 percent 2-ethylhexyl 2-ethylhexyphosphonic acid, e.g., Ionquest® 801 manufactured by Albright & Wilson, in a kerosene diluent. Scandium is extracted by the solvent while thorium and other impurities, such as iron and aluminum, remain in the raffinate. The loaded organic is then stripped with 2.0M hydrogen fluoride (HF) solution and the resulting solution is decomposed in a CSTR to form scandium hydroxide with the addition of NaOH and heat. Oxalic acid is added to the raffinate containing thorium to precipitate thorium oxalate which is separated from the liquor by pressure filtration and drummed for product shipment (FIG. 7).

Part IV (E)—Oxalate Precipitation and Drying

The decomposed scandium in the strip solution from the solvent extraction circuit is fed to a batch reactor where oxalic acid is added (FIG. 7) in the proportion of 1.1 LB to 1.0 LB scandium in solution. The resulting scandium oxalate precipitant is filtered and dried at 750° C. to yield the oxide with a purity greater than 95 percent and preferably 99.0 percent. Radioactivity from uranium and thorium isotopes is less than 0.01 percent.

Part V (A)—Tantalum Concentrate Recovery

The purpose of the various leaching and digestion operations is to strip away as much of the non-tantalum/columbium (non-Ta/Nb) ($M_2O_5$) components as possible leaving a high quality tantalum product. Since calcium is the predominant impurity in the residue (averaging 16 percent), the overall solubility of the sulfated solids is limited by the relatively insoluble calcium sulfate formed during sulfation. To recover a tantalum concentrate with an $M_2O_5$ content similar to commercial tantalite ore concentrates, additional treatment of the water leach solids is required to dissolve the insoluble sulfates. As well, thorium is incompletely leached causing the product to be more radioactive than desired. Relevant unit operations on the solids remaining after the water leach step (FIG. 1, #6) include an initial hydrochloric acid digestion (FIG. 1, #7), sulfate metathesis (FIG. 1, #8), final acid digestion (FIG. 1, #9), solids washing, filtration, and drying (FIG. 1, #10 and #11). With this series of operations, the $M_2O_5$ concentration will be consistently greater in the product than the residue by a factor of at least 10. For example, the average 3 percent $M_2O_5$ content in the residue translates to at least a 30 percent content in the tantalum product.

The major loss of Ta/Cb (Ta/Nb) occurs as a result of the water leach step. However, in another step, for scandium recovery, addition of phosphoric acid (FIGS. 3 through 5) causes the bulk of the soluble Ta/Cb (Ta/Nb) to precipitate also. When dissolved in the HF solution, as described above in Part IV (C), the Ta/Cb (Ta/Nb) is separated from the bulk of the zirconium (FIG. 6) by precipitation of the fluozirconate. The Ta/Nb remaining in solution is precipitated with NaOH, filtered and fed to the sulfate metathesis where it is subsequently combined with the $M_2O_5$ solids before the final drying step (FIG. 1, #11).

Part V (B)—Hydrochloric Acid Digestion

Since calcium sulfate is soluble in hot hydrochloric acid, the second operation was developed based on this chemistry. Water-leached solids are fed to a CSTR with operating conditions of 5 percent pulp density, 90° C. temperature, 30 minute residence time, and a 2M hydrochloric acid concentration (FIG. 1, #7). The bulk of the calcium sulfate as well as significant amounts of thorium, radium, iron, and zirconium are dissolved in this step. Overall, about 25 percent of the residue mass is separated from Ta/Cb (Ta/Nb) in the hydrochloric acid digest. Despite the significant mass reduction, this digest still does not provide a tantalum product sufficiently high in $M_2O_5$ content. Double sulfate compounds formed in the sulfating step are resistant to acid leaching thus requiring that a third treatment be undertaken.

Part V (C)—Sulfate Metathesis

Double sulfate compounds are easily converted to acid-soluble hydroxides by a metathesis technique used in rare earth processing (FIG. 1, #8). In this technique the sulfated solids are contacted with dilute caustic soda at temperatures between 70° C. and 90° C. for at least 30 minutes. The chemistry is illustrated by the following theoretical reactions.

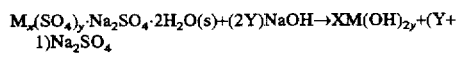

For M=calcium:

Acid-leached solids are flocculated with polymer, thickened in a settler, washed in a counter-current decanter and fed to a CSTR with operating conditions of 10 percent pulp density, 90° C. temperature, one hour residence time and a 15 percent caustic soda concentration (FIG. 1, #8). This conversion to hydroxide solids is followed by a second hydrochloric acid digest (FIG. 1, #9) which reduces the mass of the final solids to less than 10 percent of the residue (composite material) input. As much as 10 percent of the residue (composite material) scandium may be contained in the second acid liquor, as well as significant portions of the thorium and zirconium. Typical chemistry of the second acid leach (FIG. 1, #9) is as follows:

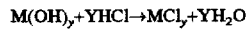

For M=calcium:

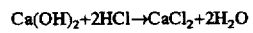

The final leach solids are flocculated with anionic polymer, thickened in a settler, washed with a counter-current decanter, separated from the chloride liquor with a filter press and dried in a gas-fired belt dryer to produce a drummed tantalum product with the typical composition shown in Table III. With a radium-226 activity of about 100 pCi/g, the final product is significantly less radioactive than typical tantalum ore concentrate.

Part VI—Uranium Recovery

Uranium is extracted from the water leach liquor in a multistage counter-current mixer/settler unit. The process is as per FIG. 3. An organic solvent containing a primary amine preferably PRIMENE JMT® at a 0.14 to 0.28M concentration in odorless kerosene (OK) with 5 percent decanol as a modifier is used to recover uranium as well as any thorium, zirconium, and scandium remaining in the leach liquor after phosphate precipitation. The PRIMENE JMT® preferably comprises more than 80 percent by weight T-alkyl primary amines (CAS Reg. No. 68955-54-4) and less than 20 percent octadecene (CAS Reg. No. 27070-58-2). Amine extraction is utilized for operations involving uranium and thorium. The following reaction equations illustrate the extraction and stripping chemistry involved, as per FIG. 3, #2 and #3.

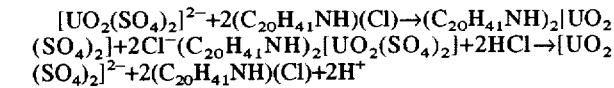

Extraction in the unit is carried out in several stages with the amine (FIG. 3, #2). The ratio of organic solvent to leach solution (O/A) is established such that the organic phase is loaded near capacity with respect to uranium. This ensures rejection of the rare earth metals and any impurities such as iron. Stripping of the loaded solvent is carried out in several additional stages using 2.0M hydrochloric acid at an O/A of about 3.1 (FIG. 3, #3). The solvent exiting the stripping solution of the mixer/settler unit does not require additional regeneration as it is suitable in the chloride form for repeated recycle and extraction of uranium.

After extraction of uranium and the other residual metal values, the aqueous raffinate is fed to the rare earth recovery section where a double sulfate precipitation will provide a marketable REO product (FIG. 3, #4 and #5). The uranium and thorium concentrations in the raffinate are reduced to less than 5 PPM ensuring that solids precipitated in the wastewater treatment plant have an activity less than 100 pCi/g (FIG. 3, #4 and FIG. 9).

The HCl strip solution (FIG. 3, #3, and FIG. 5, #1) is fed to a CSTR where a third phosphate precipitation is conducted to remove any scandium, thorium, and zirconium present. The precipitated phosphate solids are separated and combined with the larger amounts obtained from the water leach and HCl liquors (FIG. 6, #1). The pH of the resulting filtrate is then raised to 2.0 with a caustic solution (FIG. 5, #2) and the stream diluted 100 percent with water (FIG. 5, #3) in a second CSTR in preparation for uranium precipitation as the peroxide (FIG. 5, #4). Used on a commercial scale, peroxide precipitation is sufficiently selective to produce a good quality yellowcake which is crystalline and handles easily. In a third CSTR, hydrogen peroxide is added at a dosage between 100 percent to 130 percent of the stoichiometric requirement indicated by the following reaction as per FIG. 5, #4.

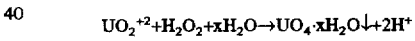

Additional caustic is added to maintain the pH between 3.0 and 4.0 for the required residence time of 30 minutes. The uranium precipitate is separated by pressure filtration and the resulting filtercake drummed as uranium yellowcake product.

Part VII—Hydrochloric Acid Reuse

Significant amounts of hydrochloric acid are utilized in the two digestions (FIG. 1, #7 and #9) after the water leach (FIG. 1, #6) and after the sulfate metathesis (FIG. 1, #8). The cost of consuming this much acid and the potential environmental impact of discharging acid as a neutralized brine liquor dictate that acid reuse be an integral part of the process. Since the HCl digest liquors contain the scandium and radioactivity remaining in the composite material (residue) solids after the water leach step, additional recovery steps are required before the liquor is fed to the HCl recovery system. These steps include ion-exchange, radium co-precipitation, and precipitation of bulk impurities. (Refer to FIG. 4.)

The HCl liquors from No. 1 and 2 digests (FIG. 1, #7 and #9) are combined and phosphoric acid added in a similar manner as for the water leach liquor to precipitate scandium, thorium, and zirconium (FIG. 4, #1). After flocculation with polymer and filtration, the resulting liquor is fed to a continuous, ion-exchange unit containing Diphonix™ resin to recover any remaining scandium, uranium, and thorium not recovered in the previous steps (FIG. 4, #2). A dual-mechanism polyfunctional resin containing sulfonic and gem-diphosphonic acid groups, Diphonix™ is available commercially from Eichrom Industries, Inc. The resin has a high affinity for uranium, thorium, and scandium in acidic solutions. The liquor is fed to the system at a rate of between 10 and 15 bed volumes per hour. Loaded resin is eluted with a 2.0M ammonium carbonate solution which after neutralization, precipitation and filtration of the metals is suitable for discharge to a Public Owned Treatment Works (POTW). Refer to FIG. 4, #4.

Though fixed bed ion-exchange systems could be used, a continuous ion-exchange unit available from Advanced Separation Technologies, Inc. is preferred due to its economical use of the Diphonix resin and elution chemicals. The ion-exchange system consists of 30 resin columns arranged on a moving carousel. Feed liquor, washes and eluent are constantly fed counter-current to the resin via stationary ports aligned with the inlet and outlet of each column. The column arrangement and liquid flow regime minimizes chemical consumption and resin inventory while maximizing concentrations of extracted components in the eluate.

Radium in the composite material (residue) solids extracts into the HCl liquor, but is not removed by ion-exchange. Barium chloride is thus added to the ion-exchange raffinate at a dosage of 0.5 to 1.0 g/L to remove radium by a co-precipitation technique (See FIG. 4, #4). No addition of sulfuric acid is required, since sulfate for the barium precipitation exists in the HCl liquor as soluble calcium sulfate. The resulting barium sulfate precipitant is filtered off and recombined with recovered uranium.

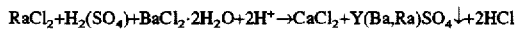

Final pretreatment of the HCl liquor consist of removing the metal impurities including most of the calcium by adding soda ash ($Na_2SO_4$) and filtering off the resulting precipitate. (See FIG. 4, #5 and #6.) Reducing the calcium loading to the evaporator will allow a greater volume reduction of the feed and hence greater HCl recovery, for return to use as per FIG. 4, #7 and FIG. 1, #7 and #9.

Due to the complexity of the acid leach liquors, evaporation was chosen as a simple and dependable means of reusing hydrochloric acid. The added sulfuric acid increases chloride volatility thereby maximizing hydrochloric acid recovery. Evaporator overheads of acid and water are separated in an absorption column with the concentrated acid recycled to the digestion operations (FIG. 1, #7 and #9) and excess water discharged to the wastewater treatment plant (FIG. 9, #1). The evaporator is designed to operate at atmospheric pressure and a temperature of approximately 100° C.

Part VIII—Rare Earth and Zirconium Recovery

The recovery of rare earths involves the precipitation of the double sulfate from the water leach liquor exiting the uranium solvent extraction step (FIG. 3). With the prior removal of essentially all the scandium, thorium, zirconium, tantalum/columbium, and uranium by phosphate precipitation and solvent extraction, the precipitate can be marketed as a feed for the production of rare earth chemicals. The chemistry of the rare earth double sulfate precipitation is shown by the following reaction.

The rare earth solids are separated by pressure filtration and the filtrate sent to wastewater treatment along with the scrubber acid (FIG. 2).

Zirconium is carried through the composite material process along with scandium, thorium, and Ta/Cb (Ta/Nb) via phosphate precipitation where it is separated from scandium, thorium, and Ta/Cb (Ta/Nb) by first leaching with 30 percent to 40 percent $H_2SO_4$ and then 3 percent HF solution. Sodium fluoride (NaF) is added to the dissolved zirconium and hafnium acid stream to precipitate out sodium fluozirconate (hafniate) as per the following reaction (FIG. 6).

$$2ZrF_4 + 3NaF + H_2) \rightarrow Na_3Zr_2(OH)F_{10} + HF$$

The resulting fluozirconate(hafniate) compounds are metathesized with NaOH to form Zr/Hf hydroxide compounds (FIG. 8, #1). The hydroxide compounds are dissolved in nitric acid ($HNO_3$) to allow the separation of zirconium from hafnium by solvent extraction. Zirconium is extracted from the nitric acid liquor in a multistage counter-current mixer/settler unit where it is contacted with an organic solvent containing tributyl phosphate (TBP) in odorless kerosene. The following reaction equations illustrate the extraction and stripping chemistry involved, as per FIG. 8, #3 and #4.

$$Zr(NO_3)_4 + 2TBP \rightarrow Zr(NO_3)_4 \cdot 2TBP$$

$$Zr(NO_3)_4 \cdot 2TBP + H_2O \rightarrow Zr(NO_3)_4 + 2TBP + H_2O$$

Zirconium extraction is carried out in several stages with TBP followed by scrubbing with nitric acid to remove residual amounts of hafnium from the solvent. Stripping the solvent is carried out in one final stage with water containing a small amount of nitric acid (0.05N) to provide a strip solution of zirconium nitrate with less than 1.0 percent hafnium content.

After extraction of zirconium, sodium phosphate is added to the aqueous raffinate to precipitate the hafnium which is filtered off and combined with fluoride precipitates generated in Acid Gas Treatment (FIG. 2, #2). The treated raffinate is now available for reuse as feed solution to solvent extraction when contacted with additional zirconium and hafnium hydroxides.

Ammonia is added to the strip solution to precipitate zirconium hydroxide ($Zr(OH)_4$) which is filtered and dried in an oven at 400° C. The dried $Zr(OH)_4$ is converted to zirconium oxide ($ZrO_2$) by heating in a retort to 700° C.

Part IX (A)—Air Pollution Control

The sulfating operation generates hydrofluoric and sulfuric acid (15 percent stoichiometric excess) gases from the chemical reaction and a small amount of particulate from the calcination. Through a combination of centrifugal separation and liquid scrubbing (FIG. 2), the acids and particulate are removed from the gas stream which is emitted from a continuously monitored stack. Treatment of the resulting scrubber liquors is discussed below.

Part IX (B)—Wastewater Treatment

Referring to FIG. 9, evaporator bottoms from HCl recovery, effluents from the scandium and zirconium recovery sections and spent caustic from the sulfate metathesis are combined in a mix/hold tank. Additional caustic is added, if required to obtain a pH of 8.0 and effect separation of any metal residuals by precipitation and filtration. The filtered solids are returned to the initial sulfation step via the spray dryer. The filtrate is mixed with the discharges from the off-gas scrubbers and continuously fed to the wastewater treatment plant where lime is added to precipitate the acid fluorides and sulfates as well as other dissolved composite material (residue) components (FIG. 2, #2). Typical precipitation reactions are given below:

$$2HF + Ca(OH)_2 \rightarrow CaF_2\downarrow + 2H_2O$$

$$H_2SO_4 + Ca(OH)_2 \rightarrow CaSO_4 \cdot 2H_2O\downarrow$$

The resulting slurry is discharged to settling tanks or ponds where the solids settle out and the clarified effluent is discharged.

EXAMPLE

Figure 11:
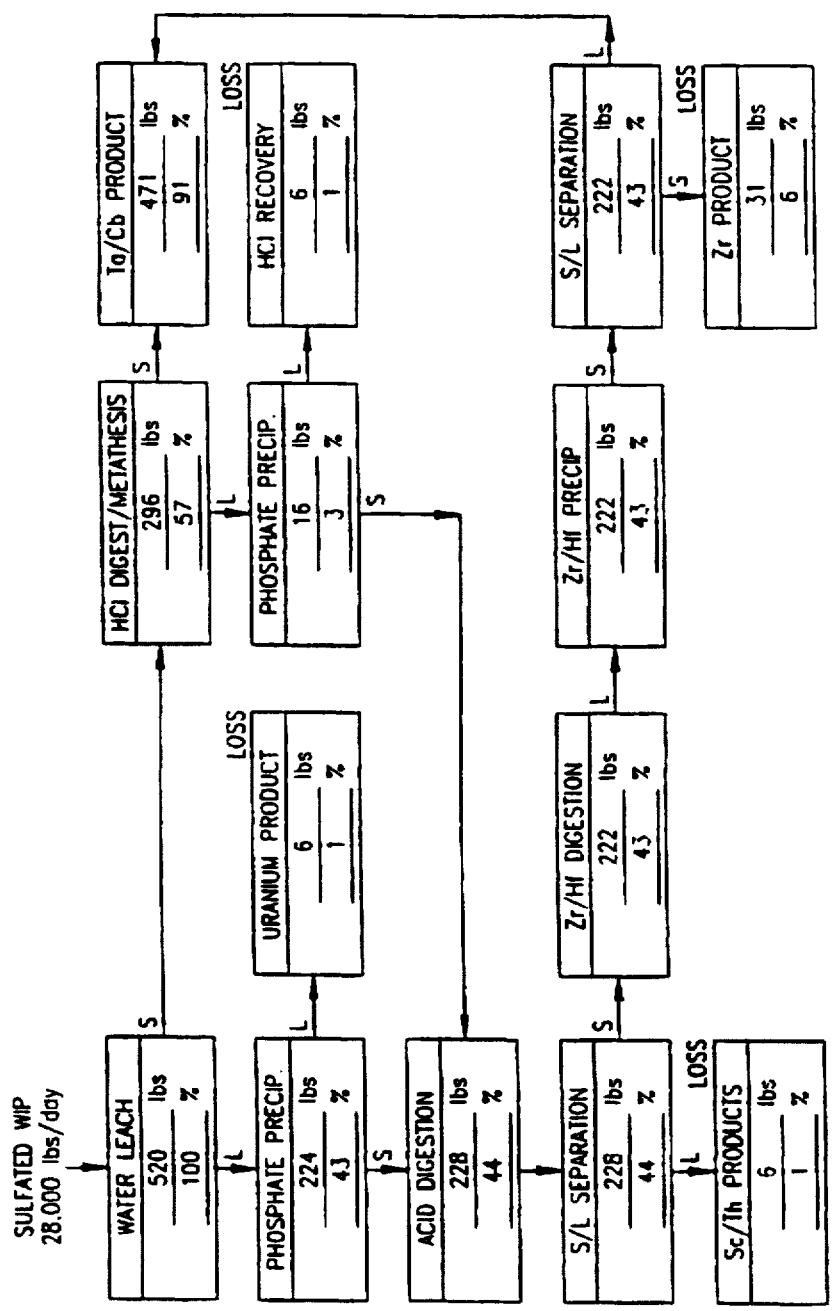
FIG. 11 is a block diagram showing tantalum and columbium (niobium) yield and losses derived during an actual test of the process.

Key features of the overall process were tested to verify the substantially high volumes of concentrated materials recoverable form the process as defined in FIGS. 1 through 9. Block diagram FIGS. 10 and 11 exemplify the tests conducted. It was found that prior to the water leach step, there is essentially no loss of metals from the composite material process. Composite material is removed from holding ponds and processed through a spray dryer and calciner, as described earlier. Particulate emissions from these operations are estimated to be about 2 percent of the 10 tons per day of composite material input, of 400 pounds per day. It is estimated that 90 percent of this off-gas loading is recovered by an aerodynamic module which employs centrifugal separation in a unique design that enhances particulate collection. With this initial treatment, only 40 pounds of the initial composite material is collected by two scrubbers in series, and hence lost from the process. The 40 pounds represents 0.2 percent losses of the Ta/Cb (Ta/Nb) and Sc assuming average composite material concentrations of 2 percent and 0.15 percent, respectively. Ta/Cb (Ta/Nb) and Sc inputs to the block diagrams of FIGS. 10 and 11 are based on processing 10 tons per day composite material containing average concentrations of 1 percent, 1 percent, and 0.16 percent for Ta, Cb (Nb), and Sc, respectively. With 100 percent recovery from the estimated 10 tons per day of composite material, about 0.87 tons per day of tantalum concentrate will be recovered with a minimum $M_2O_5$ content of 30 percent and a Ta:Cb (Ta:Nb) ratio of 1:1. Assuming, again, 100 percent yield, 0.0245 tons per day of scandium oxide will be recovered from the 10 tons per day of composite material.

The bulk of the scandium is separated from the composite material in the water leach step. The sulfated solids are contacted with hot water causing the scandium to dissolve in the resulting liquor. FIG. 10, which summarizes the composite material recovery process with respect to scandium yield, shows over 85 percent of the scandium reporting to the phosphate precipitation step as water leach liquor. With the exception of about 1 percent in the final Ta/Cb (Ta/Nb) product, the remaining scandium is dissolved in the subsequent HCl digest steps.

Phosphate precipitation is the major mechanism for separating scandium from the bulk of the composite material impurities in both the water leach and HCl digest liquors. As shown, scandium not removed by precipitation from the water leach liquor is retained by the primary amine solvent extraction step and subjected to a second phosphate precipitation during uranium recovery with only 1.0 percent lost to the uranium product. With the HCl digest liquors, however, no losses occur, since phosphate precipitation is followed by an ion-exchange system which retains any residual scandium not precipitated and returns it to the front of the process as precipitated hydroxide.

The precipitated phosphates of scandium along with zirconium and thorium are first leached in 30 to percent 40 percent sulfuric acid ($H_2SO_4$). In the leach digestion, the bulk of the scandium and thorium is dissolved while the Zr/Hf and Ta/Nb remain as solid phosphates. The subsequent digestion of the Zr/Hf and Ta/Nb solids and precipitation of the fluozirconate(hafniate) represents the largest scandium losses in the process, i.e., 6 percent of the input. The scandium is separated from thorium by solvent extraction. At 0.2 percent of input, losses to the thorium product are very low.

In summary, scandium losses will, on average total about 8 percent of the input provided from processing 10 tons per day composite material. The losses are divided between the Ta/Cb (Ta/Nb) product, zirconium product, uranium product, thorium product, and HCl recovery with the direct loss from Zr/Hf recovery being the most significant.

The major loss of Ta/Cb (Ta/Nb) occurs as a result of the water leach step. The pond samples used during the development of the process indicated that losses to the water leach liquor would not exceed 10 percent. However, in the more recent testing, losses were in excess of 40 percent. In the next step though, most of the Ta/Cb (Ta/Nb) is recovered, since it precipitates out as a phosphate with the scandium, thorium, and zirconium. Ta/Cb (Ta/Nb) not precipitated as phosphate will be lost to either the uranium product or to HCl recovery as shown in the block diagram of FIG. 11.

The Ta/Cb (Ta/Nb) phosphates are digested along with the Zr/Hf in 3 percent HF solution. The Ta/Cb (Ta/Nb) is then separated by precipitating the bulk of the zirconium as sodium fluozirconate. The Ta/Cb (Ta/Nb) that precipitates, about 6 percent of the input, is filtered out and lost to the zirconium products. The soluble Ta/Cb (Ta/Nb) is subsequently precipitated from the filtrate stream by adding NaOH and returned to the sulfate metathesis step where it combines with the $M_2O_5$ solids and is subjected to the second HCl leach.

In summary, Ta/Cb (Ta/Nb) losses total 9 percent of the input provided from processing 10 tons per day composite material. The losses are divided between the products, scandium, zirconium and uranium. Based on the above described process it was concluded that a resource recovery operation focusing on tantalum, columbium, and scandium is technologically feasible and results in the isolation of natural radioactive components. Key portions of the process as described above were tested in order to verify the attainment of many important objectives. It was determined that the following key objectives have been met in this process. At least 85 percent of the tantalum and columbium (niobium) contained in the feed composite material is recovered as a concentrate containing greater than 20 percent $M_2O_5$ and less than 0.1 weight percent uranium and/or thorium. Long lived radioactive components leached from the composite material, such as uranium, thorium, and radium, are isolated in the uranium and thorium products. Only a small portion remains in the recovered tantalum product at a very much lower concentration for such ore concentrates. At least 85 percent of the scandium contained in the initial feed composite material is recovered as a greater than 95 percent oxide product, suitable for alloy production or secondary processing. The fluoride and other gangue material of the composite material is able to be discharged to ponds as solids, because the activity level does not exceed 100 pCi/g.

Advantageously, as can be seen, scandium and tantalum/niobium yields from composite materials are shown to be over 90 percent. As a result, for the first time, it is possible to recover substantial amounts of concentrated, commercially usable forms of tantalum, niobium, scandium, uranium, and thorium from residues. The invention provides such a process which is energy efficient, and provides highly concentrated products from industrial tailings or waste. In addition, the invention advantageously provides for internal recycling and re-use of waste streams to further enhance environmental and energy efficiency.

TABLE I

MAJOR COMPONENTS

| Component | % dry weight |
|---|---|
| Aluminum | 6.0 |
| Calcium | 16 |
| Fluoride | 33 |
| Iron | 2.2 |
| Potassium | 1.0 |
| Sodium | 1.3 |
| Silicon | 2.2 |
| Magnesium | 1.4 |
| Rare Earths | 3.6 |
| Scandium | 0.16 |
| Tin | 0.8 |
| Titanium | 3.0 |
| Tantalum | 1.0 |
| Columbium (Nb) | 1.0 |
| Uranium | 0.2 |
| Thorium | 0.5 |
| Zirconium | 4.6 |
| Hafnium | 0.3 |

TABLE II

COMPOSITION OF WATER LEACH LIQUOR

| Metal | Concentration, PPM |
|---|---|
| Tantalum | 320 |
| Columbium | 420 |
| Scandium | 150 |
| Cerium | 640 |
| Zirconium | 3,900 |
| Uranium | 200 |
| Thorium | 300 |
| Iron | 1,070 |
| Aluminum | 3,670 |

TABLE III

PERCENT COMPOSITION OF TANTALUM PRODUCT

| | |
|---|---|
| $Ta_2O_5$ | 15 |
| $Cb_2O_5$ | 16 |
| $TiO_2$ | 12 |
| $SNO_2$ | 9 |
| $SiO_2$ | 12 |
| Al | 1.5 |
| Ca | 8 |
| Cr | 2.3 |
| Fe | 2 |
| Na | 2.7 |
| Zr | 9.3 |
| As | <0.01 |
| Sb | <0.01 |
| $ThO_2$ | <0.01 |
| $U_3O_8$ | <0.01 |

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

1. Method for recovering constituents from a composite material which comprises tantalum oxides and niobium oxides, and other metals (M) at least a portion of which are present as metal fluoride compounds ($MF_y$), said method comprising the steps of:

a. reacting said metal fluoride ($MF_y$) compounds of said composite material with sulfuric acid ($H_2SO_4$) to form metal sulfate ($M(SO_4)_{y/2}$) compounds from said metal fluoride compounds and to form hydrogen fluoride (HF) according to the reaction:

$$MF_y + (Y/2)H_2SO_4 \rightarrow M(SO_4)_{Y/2} + YHF (1 \leq y \leq 6);$$

b. washing the composite material with water to remove at least a portion of said metal sulfate ($M(SO_4)_{y/2}$) compounds from said composite material, whereby said removed portion is leached into said water and forms a leachate solution.

c. solubilizing, in a first acid solution comprising hydrochloric acid (HCl) or nitric acid ($HNO_3$), any metal sulfate compounds remaining in said composite material after step (b), thereby removing at least a portion of said remaining metal sulfate compounds in said first solution;

d. reacting any double sulfate compounds ($M_x(SO_4)_y \cdot NaSO_4 \cdot 2H_2O$) among said metal sulfate compounds in said material with caustic soda (NaOH) in a caustic solution to form metal hydroxide compounds (XM(OH)2y) according to:

$$M_x(SO_4)_y \cdot Na_2SO_4 \cdot 2H_2O + (2Y)NaOH \rightarrow XM(OH)_{2y} + (Y+1)Na_2SO_4$$

where $1<y<3$, and removing said caustic solution;

e. reacting said metal hydroxide compounds ($M(OH)_{2y}$) with a second acid solution comprising HCl or $HNO_3$ to form metal chloride compounds or metal nitrate compounds according to:

$$XM(OH)_{2y} + 2YHCl \rightarrow MCl_{2e} + 2YH_2O;$$

or $$XM(OH)_{2y} + 2YHNO_3 \rightarrow M(NO_3)_{2y} + 2YH_2O$$

where $1 \leq x \leq 2$, $1 \leq y \leq 3$;

f. removing said metal chloride or metal nitrate compounds from the composite material of step (e) to thereby provide a residue of said composite material where said residue comprises tantalum oxide and niobium oxide in concentrated amounts relative to initial amounts of said oxides in said composite material prior to step (a); and g. collecting said residue composite materials.

2. The method according to claim 1 and further including before step (a), the further steps of: wet milling the composite material; and forming a slurry of the composite material.

3. The method according to claim 1 and further including after step (a) the further steps of treating acidic gases of step (a) with water in a scrubber to remove HF and $H_2SO_4$ and form a scrubber acid solution by: (i) reacting said hydrogen fluoride (HF) with calcium hydroxide ($Ca(OH)_2$) to form calcium fluoride ($CaF_2$) and water according to:

$$2HF+Ca(OH)_2 \rightarrow CaF_2+2H_2O;$$

(ii) reacting calcium hydroxide with said sulfuric acid to form calcium sulfate ($CaSO_4 \cdot 2H_2O$) according to:

$$H_2SO_4+Ca(OH)_2 \rightarrow CaSO_4 \cdot 2H_2O;$$

and then (iii) precipitating out the resultant $CaF_2$ and $CaSO_4 \cdot 2H_2O$.

4. The method according to claim 1 wherein the leachate of step (b) contains uranium sulfate compound $[UO_2(SO_4)_2]^{2-}$ and further comprising treating the leachate of step (b) to selectively recover uranium sulfate compound in said leachate by the further steps of:

h. contacting said uranium sulfate compound $[UO_2(SO_4)_2]^{2-}$ of said leachate with an extraction solution comprising an organic amine R—NH to extract said sulfate compounds from said leachate according to the representative extraction:

$$[UO_2(SO_4)_2]^{2-}+2(C_{20}H_{41}NH)(Cl) \rightarrow (C_{20}H_{41}HN)_2[UO_2(SO_4)_2]+2Cl^-;$$

and i. adding hydrochloric acid to said extraction solution to strip away said extracted uranium from said amine containing extraction solution according to the representative stripping:

$$(C_{20}H_{41}NH)_2[UO_2(SO_4)_2]2HCl \rightarrow [UO_2(SO_4)_2]^{2-}+2(C_{20}H_{41}NH)(Cl)+2H^+;$$

thereby providing an aqueous raffinate solution having a reduced amount of said uranium sulfate compound relative to said aqueous leachate.

5. The method according to claim 1 wherein step (f) is conducted by washing the composite material to thereby remove said metal chloride or metal nitrate compounds.

6. The method according to claim 1 wherein said reacting step (a) includes calcining said composite material comprising metal fluoride (MFY) compounds.

7. The method according to claim 1 wherein the metal sulfate compounds of step (c) include calcium sulfate compounds which are removed in said first acid solution.

8. The method according to claim 4 and including after step (i) the further step(s) of:

j. adding sodium sulfate ($Na_2SO_4$) to rare earth sulfates ($RE_2(SO_4)_3$) in said aqueous raffinate solution to precipitate rare earth double sulfates according to the representative reaction:

$$2RE_2(SO_4)_3+3Na_2SO_4 \rightarrow RE_2(SO_4)_3 \cdot 3Na_2SO_4 \cdot 2H_2O,$$

and then removing said aqueous raffinate solution; and then k. recovering said rare earth double sulfates.

9. The method according to claim 4 wherein before step (h), phosphoric acid ($H_3PO_4$) is added to the leachate of step (c) and phosphate compounds comprising Ta, Nb, Zr, Th, and Sc are precipitated as exemplified by the reaction:
$$Zr(SO_4)_2+4H_3PO_4 \rightarrow Zr(HPO_4)_4\downarrow+2H_2SO_4.$$

10. The method according to claim 1 wherein the acid solutions from steps (c) and (e) of claim 1 are HCl acid solutions which are combined with $H_3PO_4$ to form a third acid solution and to precipitate out Zr, Th, and Sc phosphate compounds.

11. The method according to claim 10 and further including:

l. adding a fourth acid solution to said third acid solution to form a fifth acid solution and contacting said fifth acid solution containing any uranium, thorium, zirconium, and scandium chloride residuals with an ion-exchange resin;

m. contacting the ion-exchange resin with an ammonium carbonate (($NH_4)_2CO_3$) solution to strip away metal chloride residuals;

n. adding barium chloride ($BaCl_2$) to said fifth acid solution to co-precipitate radium compounds by reaction with $H_2SO_4$ according to:

$$RaCl_2+H_2SO_4+BaCl_2 \cdot 2H_2O+2H \rightarrow CaCl_2+Y(Ba,Ra)SO_4\downarrow+2HCl;$$

o. adding sodium carbonate ($Na_2CO_3$) to said fifth acid solution to precipitate calcium carbonate and other metal impurities;

p. adding sulfuric acid to said fifth acid solution and feeding to an evaporator/condenser to separate hydrochloric acid into an overhead stream and to form an evaporator bottom stream; and q. returning said HCl overheads to steps (c) and (e) of claim 1.

12. The method according to claim 11 and further including:

r. adding $Na_3PO_4$ to the HCl extraction solution of claim 4 part (i) to form a sixth acid solution and to precipitate out any residual zirconium, thorium, and scandium phosphate compounds;

s. adding NaOH to said sixth solution raising pH to the range of 2.5 to 4.0;

t. adding water to said sixth solution to reduce chloride concentration below 50 g/L;

u. adding hydrogen peroxide ($H_2O_2$) to said sixth solution to precipitate uranium peroxide compound according to:

$$UO_2^{+2}+H_2O_2+xH_2O \rightarrow UO_4 \cdot xH_2O\downarrow 2H^+;$$

v. adding any radium compounds from claim 11 step (n);

w. recycling said sixth solution to claim 11 step (1) as said fourth solution which is combined with said third solution to form said fifth solution; and x. recovering uranium peroxide compound and any radium compounds.

13. The method according to claim 12 and further including:

y. combining sulfuric acid with said phosphate compounds of claim 8, claim 10, and claim 12 step (r) to dissolve scandium and thorium phosphates/sulfates while leaving undissolved Zr/Hf and Ta/Nb phosphates;

z. contacting scandium and thorium sulfate compounds of said sulfuric acid solution with an extraction solvent;

aa. contacting a hydrofluoric acid strip solution (BF) with said extraction solvent to strip scandium fluoride compounds from said extraction solvent and removing said fluoride strip solution, whereby an aqueous raffinate solution comprising thorium sulfate remains;

bb. adding oxalic acid ($C_2O_4H_2$) to said thorium sulfates in said aqueous raffinate solution to precipitate thorium oxalates; and cc. recovering said thorium oxalate.

14. The method according to claim 13 and further including:

dd. adding NaOH and heat to HF strip solution of claim 13 to precipitate scandium hydroxide compounds;

ee. adding HCl to dissolve said scandium hydroxide solids and adjusting pH to 4.0 with NaOH;

ff. heating the solution to precipitate the impurities zirconium, titanium and iron by hydrolysis thereby, removing said impurities from said scandium solution;

gg. adding oxalic acid ($C_2O_4H_2$) to said solution to precipitate scandium oxalate according to:

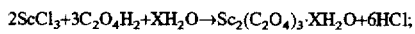

$$2ScCl_3 + 3C_2O_4H_2 + XH_2O \rightarrow Sc_2(C_2O_4)_3 \cdot XH_2O + 6HCl;$$

hh. calcining scandium oxalate compounds at 750° C. to form scandium oxide compound; and ii. recovering said scandium oxide compound.

15. The method according to claim 14 and further including:

jj. combining HF solution with said Zr/Hf and Ta/Nb phosphate solids of claim 13 step (y) to dissolve Ta/Nb and Zr/Hf while precipitating any residual scandium and thorium fluorides;

kk. adding NaF to the fluoride solution to precipitate sodium fluozirconate ($Na_3Zr_2(OH)F_{10}$) compounds and sodium fluohafniate compounds;

ll. adding NaOH to precipitate Ta/Nb compounds;

mm. recovering said Ta/Nb compounds by filtration; and nn. combining with Ta/Nb compounds on claim 1 step (d).

16. The method according to claim 15 and further including:

oo. adding NaOH solution to said sodium fluozirconate and sodium fluohafniate compounds from claim 15 step (kk) for conversion to zirconium and hafnium hydroxide compounds;

pp. adding nitric acid ($HNO_3$) to Zr/Hf hydroxide and filtering off any insolubles;

qq. contacting said Zr/Hf nitrate solution with an extraction solution to separate Hf from Zr; thereby providing an aqueous raffinate solution having reduced Zr compounds;

rr. adding water to extraction solution to strip away said Zr compounds from said extraction solution;

ss. adding ammonia to precipitate zirconium hydroxide in said aqueous strip solutions;

tt. filtering and drying said zirconium hydroxide at 400° C.;

uu. retorting said zirconium hydroxide compound at 700° C. to yield zirconium oxide compound; and vv. recovering said zirconium oxide compound.

17. The method according to claim 16 and further including:

ww. mixing said caustic solution from claim 1 step (d); said filtrate solution from claim 14 step (gg); said impurity compounds from claim 14 step (ff); said evaporator bottoms from claim 11 step (p); said NaOH solution from claim 16 step (oo); said Sc and Th fluorides from claim 15 step (jj); said filtration solution from claim 15 step (mm); said insolubles from claim 16 step (pp); and any metal residuals;

xx. adding NaOH to said solution mixture of step (ww) to raise pH to 8.0 and precipitating metal hydroxides; and yy. collecting said precipitating metal hydroxides and recycling said precipitates to form a slurry.

18. The method according to claim 17 wherein after step (yy) said precipitates of step (yy) are recycled back to before step (a) of claim 1 by combining said precipitates of step (yy) with said composite material in a slurry and then proceeding to step (a).

19. The method according to claim 17 and further including decomposition of said contacted strip solution of claim 11 step (m) with sulfuric acid and caustic to precipitate metal residuals for mixing with streams of claim 17 step (ww).

20. The method according to claim 11 wherein said ion-exchange resin contains sulfonic and gem-diphosphonic acid groups.

21. The method according to claim 13 wherein said extraction solvent of step (z) comprises 5–10 percent trialkylphosphine oxides and 5–10 percent 3-ethylhexyl 2-ethylhexylphosphonic acid odorless kerosene.

22. The method according to claim 16 wherein said extraction solvent comprises a 50% solution of tributyl phosphate (TBP) in odorless kerosene.

* * * * *

UNITED STATES PATENT AND TRADEMARK OFFICE
CERTIFICATE OF CORRECTION

PATENT NO. : 5,787,332
DATED : July 28, 1998
INVENTOR(S) : William D. Black, et. al.

It is certified that error appears in the above-identified patent and that said Letters Patent is hereby corrected as shown below:

Col 14, Line 42, in clause e., change the formula to read:

$$XM(OH)_{2y} + 2YHCl \rightarrow MCl_{2y} + 2YH_2O$$

Col 15, Line 40, in claim 6, line 3, "(MFY)" should be "(MF$_y$)".

Col 16, Line 63, in claim 13, clause aa., change "(BF)" to "(HF)".

Col 17, Line 20, in claim 14, clause hh., after "compounds" insert "of step gg".

Signed and Sealed this

Fourteenth Day of March, 2000

Attest:

Q. TODD DICKINSON

Attesting Officer

Commissioner of Patents and Trademarks